(12) United States Patent
Yamada

(10) Patent No.: US 12,452,513 B2
(45) Date of Patent: Oct. 21, 2025

(54) IMAGE PICKUP UNIT, ENDOSCOPE, AND METHOD OF MANUFACTURING IMAGE PICKUP UNIT

(71) Applicant: OLYMPUS MEDICAL SYSTEMS CORP., Tokyo (JP)

(72) Inventor: Junya Yamada, Kawasaki (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 78 days.

(21) Appl. No.: 18/379,254

(22) Filed: Oct. 12, 2023

(65) Prior Publication Data

US 2024/0040224 A1 Feb. 1, 2024

Related U.S. Application Data

(63) Continuation of application No. PCT/JP2021/024119, filed on Jun. 25, 2021.

(51) Int. Cl.
| | | |
|---|---|---|
| *H04N 23/50* | (2023.01) | |
| *A61B 1/00* | (2006.01) | |
| *A61B 1/05* | (2006.01) | |
| *G02B 23/24* | (2006.01) | |
| *H05K 1/02* | (2006.01) | |
| *H05K 3/00* | (2006.01) | |

(52) U.S. Cl.
CPC ......... *H04N 23/555* (2023.01); *A61B 1/0011* (2013.01); *A61B 1/05* (2013.01); *G02B 23/2484* (2013.01); *H05K 1/0284* (2013.01); *H05K 3/0014* (2013.01); *H05K 2201/10151* (2013.01)

(58) Field of Classification Search
CPC ...... H04N 23/555; H04N 23/00; H04N 23/54; A61B 1/0011; A61B 1/05; A61B 1/051; G02B 23/2484; G02B 23/24; H05K 1/0284; H05K 3/0014; H05K 2201/10151; H05K 2201/10515
See application file for complete search history.

(56) References Cited

U.S. PATENT DOCUMENTS

| | | | |
|---|---|---|---|
| 2007/0126914 A1 | 6/2007 | Komatsu et al. | |
| 2011/0155317 A1* | 6/2011 | Shinoda ............... | B32B 37/1284 |
| | | | 156/285 |
| 2019/0328217 A1* | 10/2019 | Moreau ............... | A61B 1/00091 |

FOREIGN PATENT DOCUMENTS

| | | |
|---|---|---|
| JP | 2004282227 A | 10/2004 |
| JP | 2005045635 A | 2/2005 |
| JP | 2007142194 A | 6/2007 |
| JP | 2012018993 A | 1/2012 |
| JP | 2013130689 A | 7/2013 |

(Continued)

OTHER PUBLICATIONS

International Search Report dated Sep. 28, 2021 issued in PCT/JP2021/024119.

*Primary Examiner* — Nasim N Nirjhar
(74) *Attorney, Agent, or Firm* — Scully, Scott, Murphy & Presser, P.C.

(57) ABSTRACT

An image pickup unit includes: a three-dimensional wiring board including a recess on a first principal surface, in which a wall surface of the recess has an inclination angle of an upper region that is smaller than an inclination angle of a lower region; a stacked device disposed in the recess, the stacked device including an optical system and an image pickup device; and resin disposed in a gap between the recess and the stacked device.

13 Claims, 10 Drawing Sheets

(56) References Cited

FOREIGN PATENT DOCUMENTS

| | | | |
|---|---|---|---|
| JP | 6486584 | B2 | 3/2019 |
| JP | 6533787 | B2 | 6/2019 |
| WO | 2015082328 | A1 | 6/2015 |

* cited by examiner prior art

IMAGE PICKUP UNIT, ENDOSCOPE, AND METHOD OF MANUFACTURING IMAGE PICKUP UNIT

CROSS REFERENCE TO RELATED APPLICATION

This application is a continuation application of PCT/JP2021/024119 filed on Jun. 25, 2021, the entire contents of which are incorporated herein by this reference.

BACKGROUND OF THE INVENTION

1. Field of the Invention

The present invention relates to an image pickup unit including a stacked device, an endoscope including the image pickup unit with the stacked device in a distal end rigid portion, and a method of manufacturing the image pickup unit with the stacked device.

2. Description of the Related Art

It is important to reduce the diameter of an image pickup unit disposed in a distal end portion of an insertion portion of an endoscope for alleviating invasiveness.

Japanese Patent Application Laid-Open Publication No. 2012-18993 discloses a stacked device manufactured using the wafer-level packaging method for efficiently manufacturing an image pickup unit with a small-diameter. In the wafer-level packaging method, the stacked device is produced by dicing a stacked wafer in which a plurality of lens wafers each including a plurality of lenses and a plurality of image pickup devices are adhesively bonded.

International Publication No. 2015/082328 (Japanese Patent No. 6533787) discloses an image pickup unit in which a stacked device is housed in a recess of a three-dimensional wiring board.

To protect the stacked device, resin is injected into a gap between the recess and the stacked device. However, in a micro-image pickup unit, the gap between the recess and the stacked device is extremely small. Therefore, it is not easy to set an appropriate volume of resin to be injected. When the volume of resin is small, the protection of the stacked device is insufficient, thereby reducing reliability of the image pickup unit. When the volume of resin is large, a part of the light receiving surface of the stacked device is covered by the resin, thereby degrading performance of the image pickup unit.

SUMMARY OF THE INVENTION

An image pickup unit of an embodiment of the present invention includes: a three-dimensional wiring board including a recess on a first principal surface, in which a wall surface of the recess has an inclination angle of an upper region that is smaller than an inclination angle of a lower region; a stacked device disposed in the recess, the stacked device including an optical system and an image pickup device; and resin disposed in a gap between the recess and the stacked device.

An endoscope of another embodiment includes an image pickup unit including: a three-dimensional wiring board including a recess on a first principal surface, in which a wall surface of the recess has an inclination angle of an upper region that is smaller than an inclination angle of a lower region; a stacked device disposed in the recess, the stacked device including an optical system and an image pickup device; and resin disposed in a gap between the recess and the stacked device.

A method of manufacturing an image pickup unit of another embodiment includes: producing a three-dimensional wiring board including a recess on a first principal surface, in which a wall surface of the recess has an inclination angle of an upper region that is smaller than an inclination angle of a lower region, and a stacked device including an optical system and an image pickup device; disposing the stacked device in the recess; injecting resin between the wall surface of the recess and the stacked device; and during injection of the resin, ending injection of the resin based on an increasing rate of an area of the resin as observed in a direction from the first principal surface.

DETAILED DESCRIPTION OF THE PREFERRED EMBODIMENTS

First Embodiment

Figure 1:
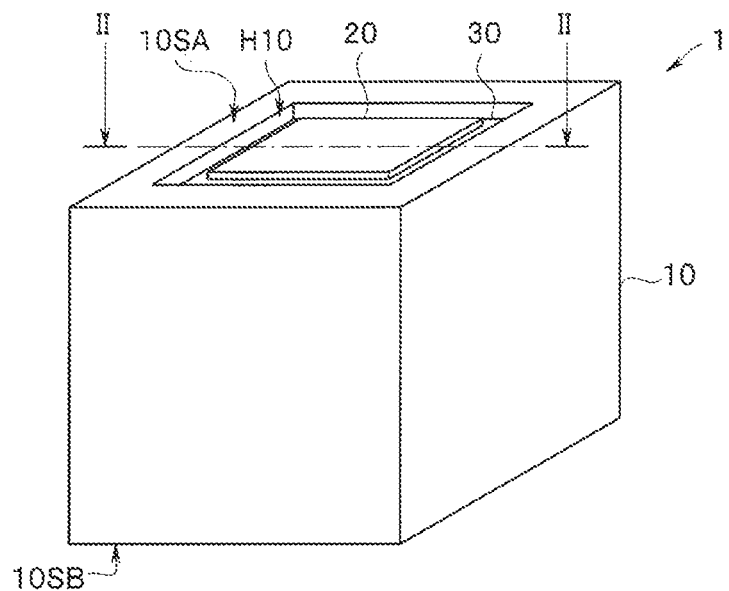
FIG. 1 is a perspective view of an image pickup unit of a first embodiment.
Figure 2:
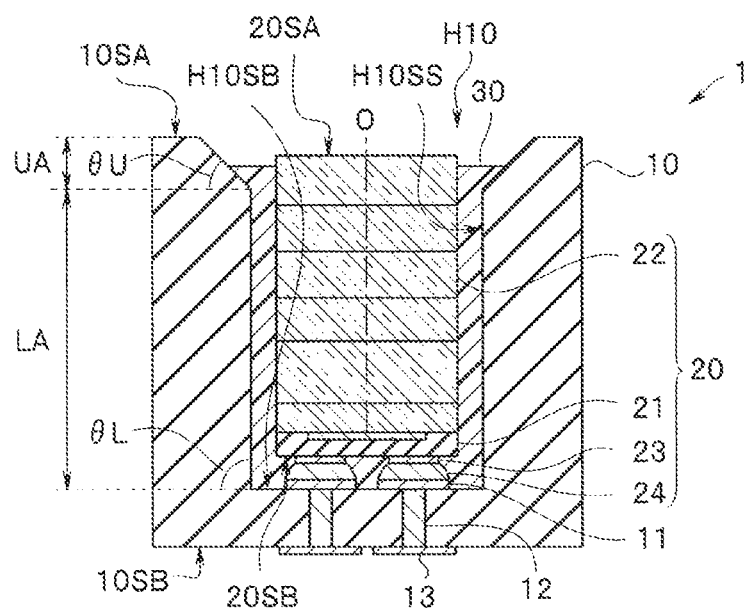
FIG. 2 is a cross-sectional view of the image pickup unit of the first embodiment taken along line II-II of FIG. 1.

As shown in FIG. 1 and FIG. 2, an image pickup unit 1 of the present embodiment includes a three-dimensional wiring board 10, a stacked device 20, and a resin 30.

Note that the drawings based on the embodiments are schematic illustrations. The relation between the thickness and the width of each portion, the ratio in thickness of each portion, and the like differ from the actual relation, ratio, and the like. There are also some portions with different dimensional relations and ratios among the drawings. Illustration of and assignment of reference signs to some constituent elements are omitted in some cases. The direction in which light is made incident is referred to as "above."

The three-dimensional wiring board 10 is, for example, a MID (molded interconnect device). The three-dimensional wiring board 10 is in a rectangular parallelepiped shape including a first principal surface 10SA and a second principal surface 10SB on a side opposite to the first principal surface 10SA. The three-dimensional wiring board 10 includes a recess H10 having a rectangular opening on the first principal surface 10SA. The recess H10 includes four wall surfaces H10SS and a bottom surface H10SB. An opening of the recess H10 may be a substantially rectangular shape with curved corners.

Note that the three-dimensional wiring board may be produced by, for example, processing using a 3D printer or cutting processing, without being limited to the MID. The material is not limited to resin, but may be ceramics or glass epoxy.

Bonding electrodes 11 are disposed on the bottom surface H10SB of the recess H10. The bonding electrodes 11 are electrically connected to electrodes 13 on the second principal surface 10SB via through wiring 12. Though not shown, a signal cable or the like is bonded to the electrodes 13. The bonding electrodes 11 may be connected to the electrodes 13 via wall surface wiring, upper surface wiring, and side surface wiring.

The stacked device 20 disposed in the recess H10 includes a light receiving surface 20SA and a back surface 20SB on a side opposite to the light receiving surface 20SA. The stacked device 20 includes an optical system 22 in which a plurality of optical devices are stacked and an image pickup device (image sensor) 21. The optical device is, for example, a hybrid lens device (composite device) including a glass plate and a resin lens or an IR cut filter device. Note that in the cross-sectional view of FIG. 2 or the like, the optical devices of the optical system 22 are shown as a flat board.

The configuration of the optical system 22, that is, the configuration (thickness, shape), the type, the number, and the stacking order of the optical devices may be modified in various ways in accordance with the specification. A patterned light-shielding film may be disposed, as an aperture, on a principal surface of any one of the optical devices.

The stacked device 20 is produced using the wafer-level packaging method that dices a bonded wafer in which a stacked wafer composed of a plurality of optical device wafers each including a plurality of optical devices and a plurality of image pickup device wafers including a plurality of image pickup devices are bonded. Therefore, the stacked device 20 is in a rectangular parallelepiped shape. The stacked device 20 may be produced such that a plurality of image pickup devices are adhesively bonded to the stacked wafer and then dicing is performed.

The image pickup device 21 with a silicon base material includes a light receiving portion composed of a CCD, a CMOS, or the like. The stacked device 20 (image pickup device 21) includes solder bumps 24 on electrodes 23 on the back surface 20SB. A semiconductor device that processes an image pickup signal may be stacked on a lower surface of the image pickup device 21 or a cover glass may be disposed on an upper surface of the image pickup device 21. The electrodes 23 are bonded to the bonding electrodes 11 on the bottom surface H10SB of the recess H10 of the three-dimensional wiring board 10 by means of the solder bumps 24. In other words, the light receiving portion of the image pickup device 21 is electrically connected to the electrodes 13 via the electrodes 23, the solder bumps 24, the bonding electrodes 11, and the through wiring 12.

For example, the resin 30 that is a thermosetting epoxy resin seals a gap between the recess H10 and the stacked device 20. The resin 30 seals the stacked device 20 and simultaneously mitigates the stress applied to the stacked device 20. To prevent external light from entering through a side surface of the stacked device 20, it is preferable that the resin 30 should have a light shielding property by, for example, including light shielding particles.

The thickness of the resin 30, that is, the width of the gap between the wall surface H10SS of the recess H10 and the stacked device 20 is preferably, for example, above 50 μm and below 500 μm. When the width of the gap is above the lower limit, the sealing effect and the stress mitigating effect are remarkable. When the width of the gap is below the upper limit, the size of the image pickup unit 1 is within the allowable range.

In the recess H10 of the three-dimensional wiring board 10, an area of an opening of the first principal surface 10SA is larger than an area of the bottom surface H10SB. In other words, the wall surface H10SS of the recess H10 is not perpendicular to, but is inclined relative to the first principal surface 10SA, the second principal surface 10SB, and the bottom surface H10SB of the recess H10.

Further, in the image pickup unit 1, the wall surface H10SS of the recess H10 has an inclination angle θU of an upper region UA that is smaller than an inclination angle θL of a lower region LA. In other words, the inclination angle of the wall surface H10SS is not constant. For example, the inclination angle θU of the upper region UA is 45 degrees, and the inclination angle θL of the lower region LA is 89 degrees. Here, the inclination angle is an angle of the wall surface H10SS relative to the bottom surface H10SB.

In a micro-image pickup unit, the gap between the recess and the stacked device is extremely small. Therefore, it is not easy to set an appropriate volume of resin to be injected. When the volume of resin is small, the protection of the stacked device is insufficient, thereby reducing reliability of the image pickup unit. When the volume of resin is large, a part of the light receiving surface of the stacked device is covered by the resin, thereby degrading performance of the image pickup unit.

In other words, since in the micro-image pickup unit, the width of the gap is extremely narrow, the appropriate volume of the resin 30 to be injected into the gap is very small Therefore, it is not easy to inject the resin 30 in an appropriate volume. Meanwhile, in the image pickup unit 1, as will be described later, in injecting the resin 30, the injection of the resin 30 is ended based on an increased volume ΔS of an area S of the resin 30 or an increasing rate ΔS/dt of the area S of the resin 30 as observed in a direction from the first principal surface 10SA (from above). Therefore, in the image pickup unit 1, the resin 30 is injected in an appropriate volume.

Therefore, the image pickup unit 1 is excellent in reliability and performance.

<Method of Manufacturing>

With reference to FIG. 3A to FIG. 5B, a method of manufacturing the image pickup unit 1 will be described.

<Production of Three-Dimensional Wiring Board and Stacked Device>

Figure 3A:
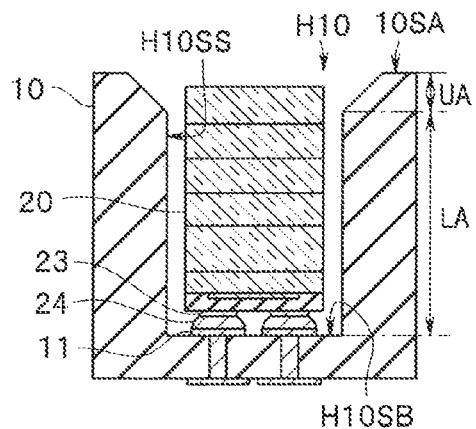
FIG. 3A is a cross-sectional view for explaining a method of manufacturing the image pickup unit of the first embodiment.
Figure 3B:
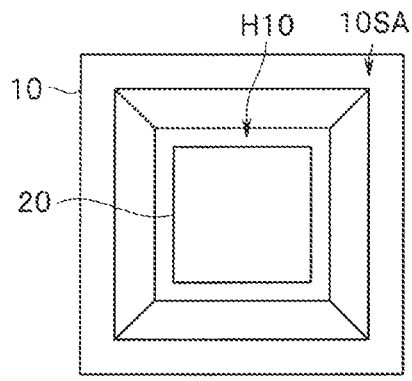
FIG. 3B is a top view for explaining the method of manufacturing the image pickup unit of the first embodiment.

As shown in FIG. 3A and FIG. 3B, the three-dimensional wiring board 10 is produced, which includes the recess H10 on the first principal surface 10SA and in which the wall surface H10SS of the recess H10 has the inclination angle θU of the upper region UA that is smaller than the inclination angle θL of the lower region LA. An outer shape of the three-dimensional wiring board 10 may be cylindrical. Further, the stacked device 20 with an outer shape in a rectangular parallelepiped shape is produced using the wafer-level packaging method.

<Disposing Stacked Device>

The stacked device 20 is disposed in the recess H10 of the three-dimensional wiring board 10. The electrodes 23 of the image pickup device 21 are bonded to the bonding electrodes 11 on the bottom surface H10SB of the recess H10 by means of the solder bumps 24.

<Resin Injection>

Figure 4A:
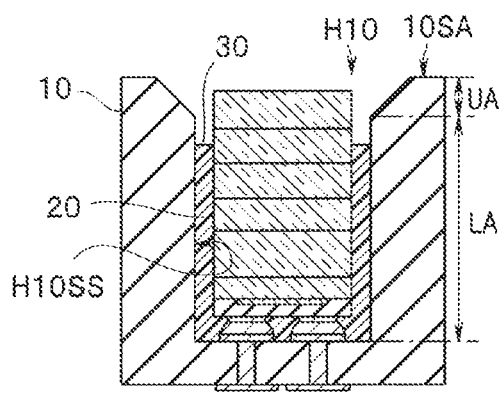
FIG. 4A is a cross-sectional view for explaining the method of manufacturing the image pickup unit of the first embodiment.
Figure 4B:
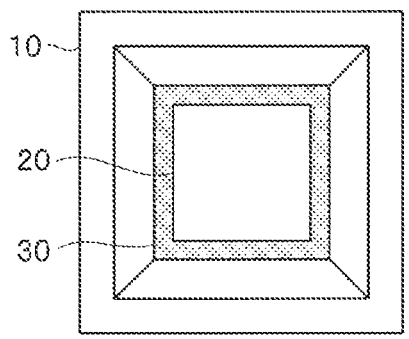
FIG. 4B is a top view for explaining the method of manufacturing the image pickup unit of the first embodiment.

As shown in FIG. 4A and FIG. 4B, the injection of the resin 30 into the gap between the wall surface H10SS of the recess H10 and the stacked device 20 is started.

Figure 6:
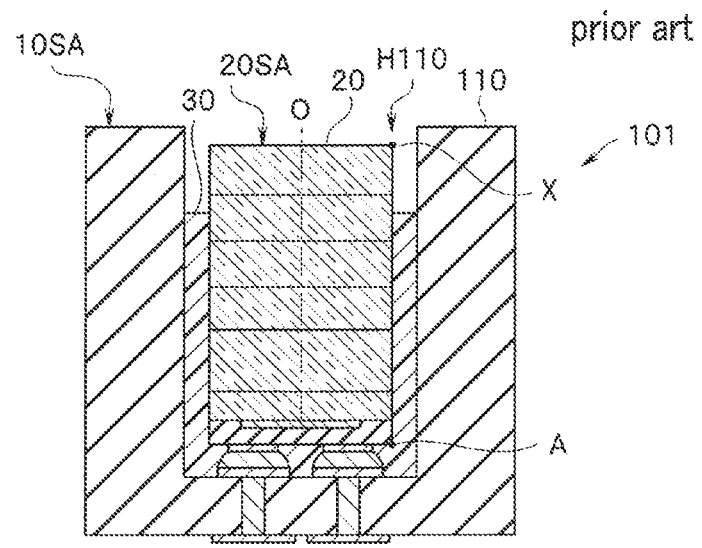
FIG. 6 is a cross-sectional view for explaining a method of manufacturing a conventional image pickup unit.

Here, for comparison, the resin injection in a conventional image pickup unit 101 (FIG. 6) having a constant inclination angle of the wall surface H10SS of a recess H110 will be described.

Figure 7:
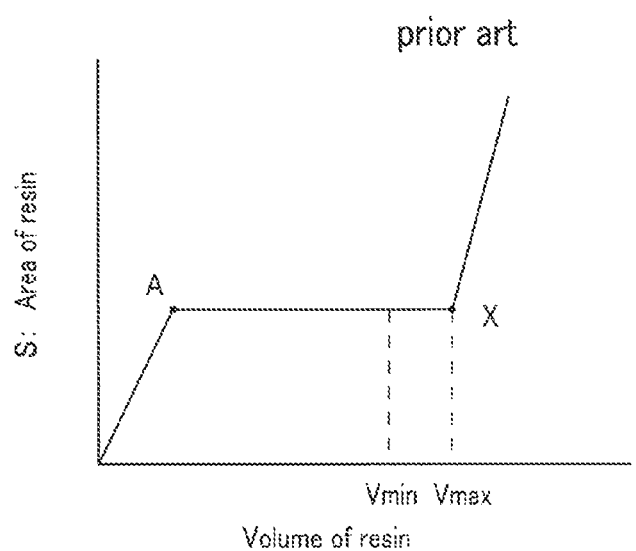
FIG. 7 is a graph for explaining resin injection in the conventional image pickup unit.

In FIG. 7, the lateral axis represents the injection volume of the resin 30 into the recess H110 and the longitudinal axis represents the area S of the resin 30 as observed in the direction from the first principal surface 10SA (from above). The area S may be observed from an image photographed by a camera or quantified through image processing of the image photographed.

The area S increases from the start of injection to a point A in a short amount of time. The area S is almost unchanged from the point A to a point X. This is because the inclination angle of the wall surface of the recess H110 is constant, and thus, the width of the gap in the depth direction of the recess H110 is almost the same. At the point X, the resin 30 starts spreading over the light receiving surface 20SA of the stacked device 20.

In other words, the area S is almost unchanged until the resin 30 is injected in a volume exceeding the maximum volume Vmax of the injection volume. Therefore, the resin 30 is injected based on an optimum injection volume presumed in advance. However, the optimum injection volume is very small, for example, above 0.1 microliters up to 10 microliters. Therefore, the allowable error of the optimum injection volume is extremely small, for example, 0.01 microliters. The size of the recess H110 and the size of the stacked device 20 vary in accordance with a manufacturing error. Further, the optimum injection volume also varies in accordance with the thermal expansion/thermal shrinkage due to temperature.

Therefore, in the conventional image pickup unit 101, occasionally, the injection volume of the resin 30 is below a minimum volume Vmin, thereby reducing reliability or above the maximum volume Vmax, thereby decreasing performance.

In contrast, as already described, in the image pickup unit 1, the wall surface H10SS of the recess H10 has the inclination angle θU of the upper region UA that is smaller than the inclination angle θL of the lower region LA (FIG. 2).

Figure 8:
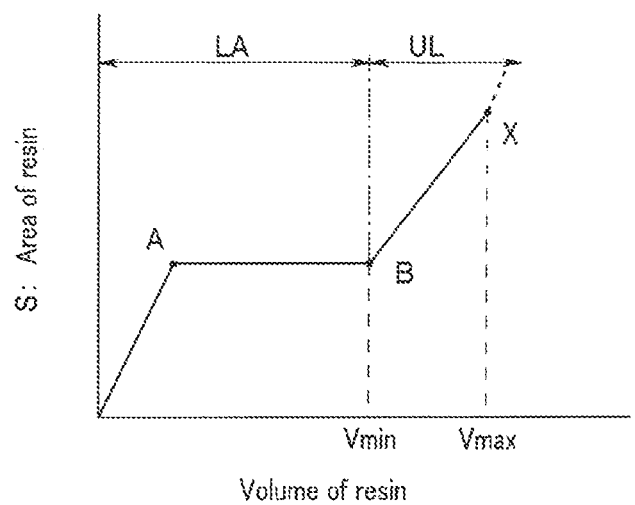
FIG. 8 is a graph for explaining resin injection in the image pickup unit of the first embodiment.

As shown in FIG. 4A, FIG. 4B, and FIG. 8, during the injection of the resin 30 into the lower region LA of the recess H10, substantially the same as in the conventional image pickup unit, the increasing rate of the area S of the resin 30 (hatched region of FIG. 4B) as observed in the direction from the first principal surface 10SA (from above) is almost constant (FIG. 8).

Figure 5A:
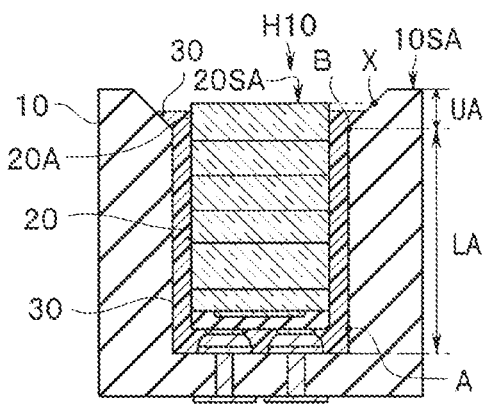
FIG. 5A is a cross-sectional view for explaining the method of manufacturing the image pickup unit of the first embodiment.
Figure 5B:
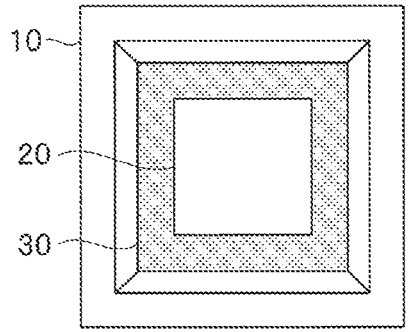
FIG. 5B is a top view for explaining the method of manufacturing the image pickup unit of the first embodiment.

As shown in FIG. 5A, when the resin 30 reaches the upper region UA (point B) of the recess H10, the area S of the resin 30 shown in FIG. 5B increases. In other words, since the increasing rate of the area S of the resin 30 is accelerated, the inclination of the area S (derivative value of the area S) increases as shown in FIG. 8. When the acceleration of the increasing rate of the area S is detected, the injection of the resin 30 is ended.

The resin 30 is subjected to a curing process after being injected into the recess H10.

The injection volume of the resin 30 can be appropriately controlled and the image pickup unit 1 is thus highly reliable and has a high performance.

The upper region UA is preferably a region where a depth from the first principal surface 10SA is 25% or less, more preferably is 10% or less, of a depth of the recess H10. When the region is within the range, the injection of the resin 30 in a volume equal to or above the minimum volume Vmin can be secured.

The upper region UA is preferably a region where a depth from the first principal surface 10SA is 3% or more, particularly 5% or more of the depth of the recess H10. When the region is above the range, the injection can be ended before the resin 30 is injected in a volume equal to or above the maximum volume Vmax.

Further, the thickness of the upper region UA is preferably less than the thickness of the optical device 20A (FIG. 5A) of an uppermost portion constituting the light receiving surface 20SA of the optical system 22, particularly, less than 80% of the thickness of the optical device 20A of the uppermost portion. As long as the region is within the range, the sealing effect of the resin 30 is not lost.

Note that the inclination angle θL of the lower region LA of the wall surface is preferably, for example, above 85 degrees and below 89.5 degrees for reducing the diameter and facilitating removal from a mold of the image pickup unit 1. Meanwhile, the inclination angle θU of the upper region UA is preferably, for example, above 20 degrees and below 60 degrees.

The cross-section of the upper region UA of the wall surface H10SS may be in a curve projecting upward or downward, instead of a straight line. In the image pickup unit having the upper region UA with a curved cross-section, the average of the derivative values of the inclination angle of the wall surface only needs to be within the range.

In the image pickup unit 1, the light receiving surface 20SA of the stacked device 20 is positioned lower than the first principal surface 10SA of the three-dimensional wiring board 10. Therefore, the resin 30 excessively injected is spread over the light receiving surface 20SA. On the other hand, in the image pickup unit in which the light receiving surface 20SA is positioned above the first principal surface the resin 30 excessively injected is spread over the first principal surface Therefore, also in the image pickup unit in which the light receiving surface is positioned above the first principal surface 10SA, the injection volume of the resin 30 needs to be precisely controlled.

Modifications of First Embodiment

Image pickup units 1A to 1D of modifications are similar to and have the same effects as the effects of the image pickup unit 1, and thus, the constituent elements having the same functions are assigned the same reference signs and the description will be omitted.

Modification 1

Figure 9:
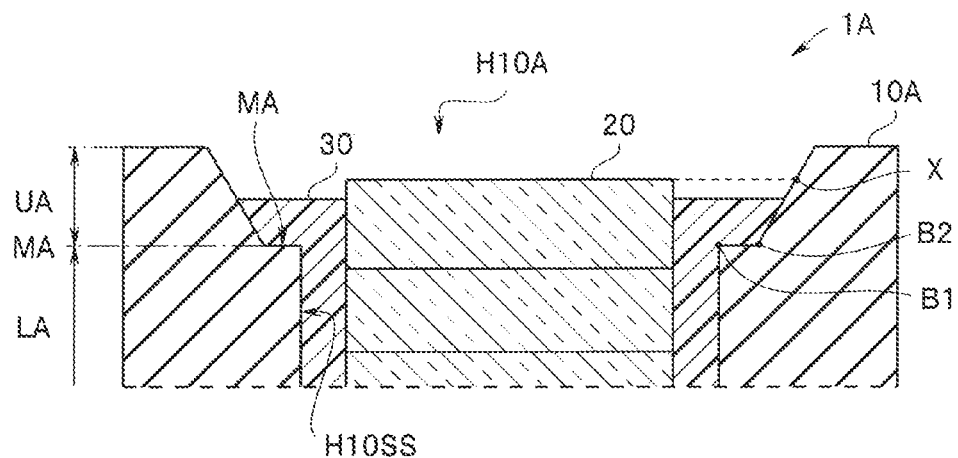
FIG. 9 is a partial cross-sectional view of an image pickup unit of a modification 1 of the first embodiment.

In the image pickup unit 1A of the present modification shown in FIG. 9, the wall surface H10SS of a recess H10A of a three-dimensional wiring board 10A includes, between the upper region UA and the lower region LA, a middle region MA with an inclination angle smaller than the inclination angle of the upper region UA, which is, for example, parallel (inclination angle of 0 degrees) or substantially parallel to the bottom surface. In other words, the middle region MA is also parallel or substantially parallel to the first principal surface 10SA and the second principal surface 10SB. "Substantially parallel" is, for example, a state in which the inclination angle of one surface relative to the other surface is less than 10 degrees. The middle region MA in a frame form may be inclined downward to the outer side (with the inclination angle less than −10 degrees).

Figure 10:
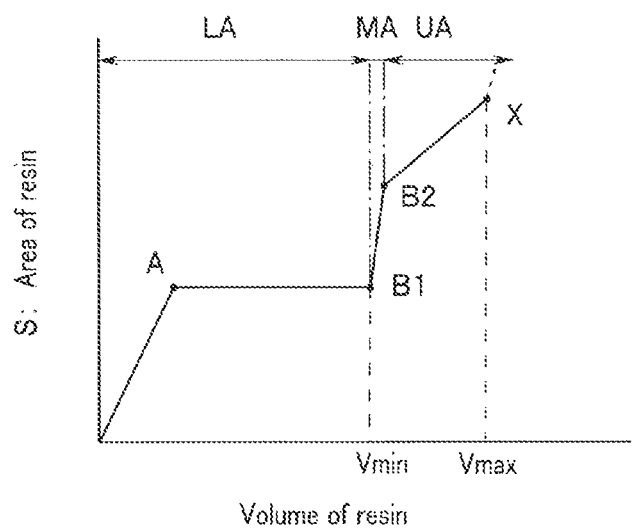
FIG. 10 is a graph for explaining resin injection in the image pickup unit of the modification 1 of the first embodiment.

As shown in FIG. 10, when the resin 30 fills the lower region LA of the recess H10A and reaches the middle region MA (point B1), the increasing rate of the area S of the resin 30 is rapidly accelerated. This is because the resin 30 is suddenly spread over the middle region MA. Then, when the resin 30 reaches the upper region UA (point B2) of the recess H10A, the increasing rate of the area S of the resin 30 decreases.

In the image pickup unit 1A, since the increasing rate of the area S of the resin 30 changes, the injection of the resin 30 in a volume equal to or above than the minimum volume Vmin can be more easily detected as compared to the image pickup unit 1.

Modification 2

Figure 11:
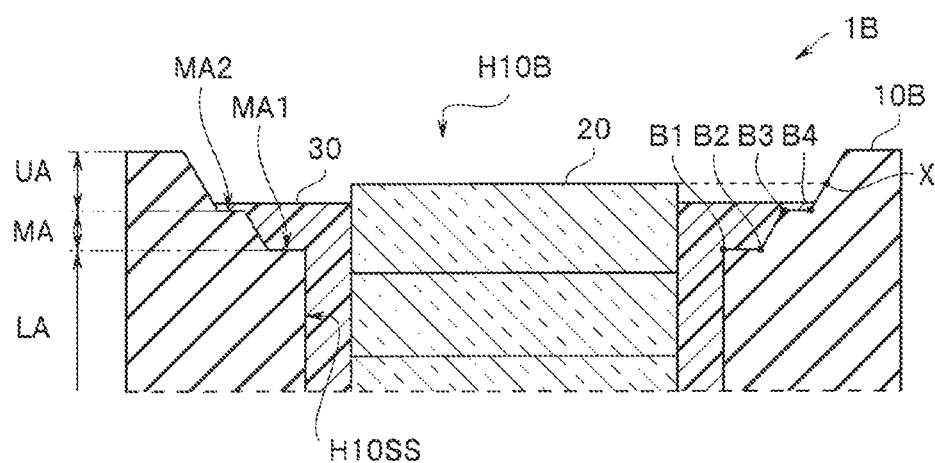
FIG. 11 is a partial cross-sectional view of an image pickup unit of a modification 2 of the first embodiment.

In the image pickup unit 1B of the present modification shown in FIG. 11, the wall surface H10SS of a recess H10B of a three-dimensional wiring board 10B includes, between the upper region UA and the lower region LA, a plurality of middle regions MA1, MA2 that are parallel or substantially parallel to the bottom surface.

Figure 12:
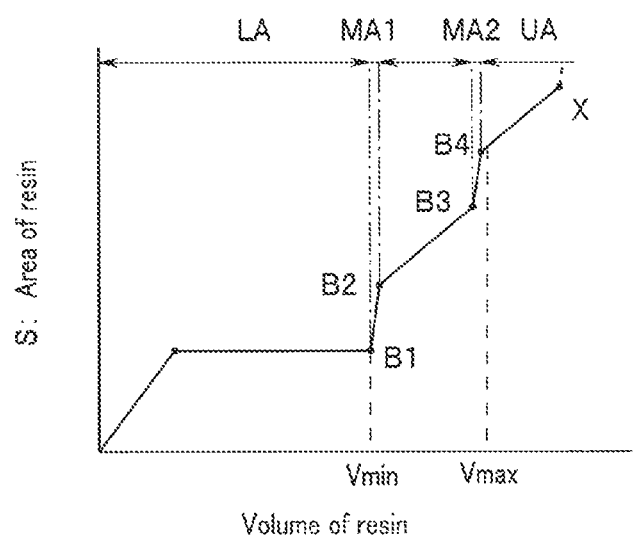
FIG. 12 is a graph for explaining resin injection in the image pickup unit of the modification 2 of the first embodiment.

As shown in FIG. 12, when the resin 30 fills the lower region LA of the recess H10B and reaches the middle region MA1 (point B1-point B2), the increasing rate of the area S of the resin 30 is rapidly accelerated. This is because the resin 30 is spread over the middle region MA1. Thereafter, the resin 30 reaches the point B2, and the increasing rate of the area S of the resin 30 decreases. Further, when the resin 30 reaches the middle region MA2 (point B3-point B4), the increasing rate of the area S of the resin 30 is rapidly accelerated again. Thereafter, the resin 30 reaches the point B4, and the increasing rate of the area S of the resin 30 decreases.

In the image pickup unit 1A, the injection of the resin 30 in the minimum volume Vmin is detected based on the increase in the increasing rate of the area S in the middle region MA1 and shortly afterwards, the injection of the resin 30 in the maximum volume Vmax is detected based on the increase in the increasing rate of the area S in the middle region MA2.

In the image pickup unit 1A, the injection of the resin 30 in a volume equal to or above the minimum volume Vmin can be easily detected, and in addition, the resin 30 can be injected in a volume not exceeding the maximum volume Vmax.

Modification 3

Figure 13:
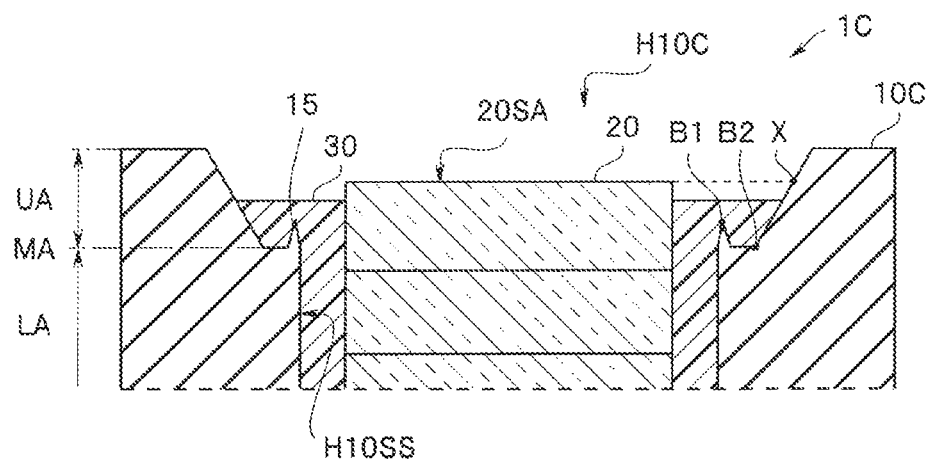
FIG. 13 is a partial cross-sectional view of an image pickup unit of a modification 3 of the first embodiment.

In the image pickup unit 1C of the present modification shown in FIG. 13, the wall surface H10SS of a recess H10C of a three-dimensional wiring board 10C includes, in the middle region MA, a projection 15 in a frame form that surrounds the stacked device 20. The height of the projection 15 is set lower than the light receiving surface 20SA of the stacked device 20.

Figure 14:
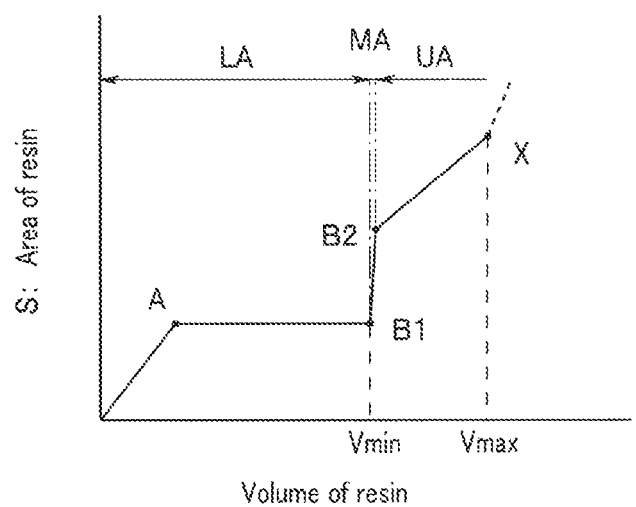
FIG. 14 is a graph for explaining resin injection in the image pickup unit of the modification 3 of the first embodiment.

As shown in FIG. 14, when the resin 30 fills the lower region LA of the recess H10C and further reaches the projection 15 (point B1), the resin 30 covering the projection 15 can be observed in the direction from the first principal surface 10SA (from above). Further, the resin 30 is spread across and around the projection 15 (point B2). Therefore, the increasing rate of the area S of the resin 30 is rapidly accelerated.

In the image pickup unit 1C, the increase of the resin 30 is observed more stepwise, so that the injection of the resin 30 in a volume equal to or above the minimum volume Vmin can be more surely detected as compared to the image pickup unit 1A.

The height of the projection 15 may not be the same around the stacked device 20. The projection 15 may be in a form partially projecting around the stacked device 20 or in a form surrounding the stacked device 20 partially or without a gap. In the image pickup unit including the projection 15 in a position surrounding the stacked device 20 in the middle region MA, the increase of the resin 30 can be observed stepwise.

Modification 4

Figure 15:
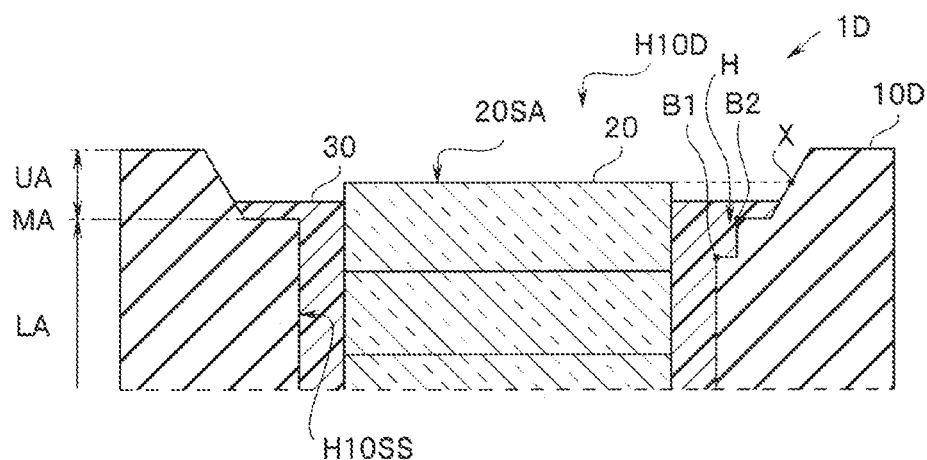
FIG. 15 is a partial cross-sectional view for explaining a method of manufacturing an image pickup unit of a modification 4 of the first embodiment.

In the image pickup unit 1D of the present modification shown in FIG. 15, the wall surface H10SS of a recess H10D of a three-dimensional wiring board 10D includes a notch H in a portion of the middle region MA substantially parallel to a bottom surface.

Figure 16:
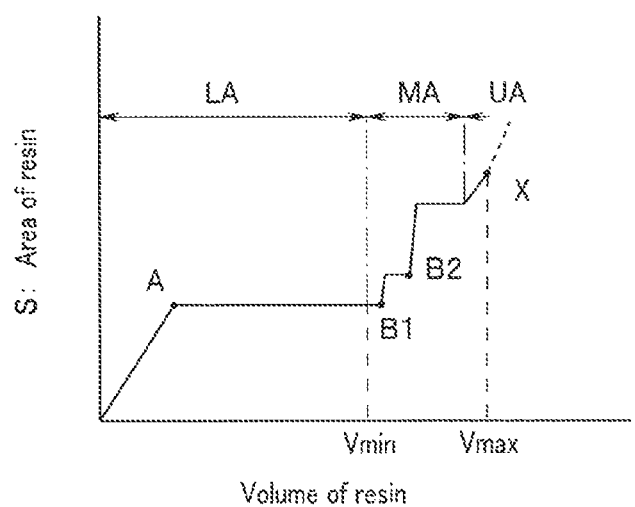
FIG. 16 is a graph for explaining resin injection in the image pickup unit of the modification 4 of the first embodiment.

As shown in FIG. 16, when the resin 30 reaches the notch H, the area S of the resin 30 is expanded (point B1). The area S of the resin 30 is substantially constant until the resin 30 fills the notch H. Thereafter, when the resin 30 reaches the middle region MA, the area S of the resin 30 is expanded (point B2).

In the image pickup unit 1D, the increase of the area S of the resin 30 is observed stepwise, so that the injection of the resin 30 in the minimum volume Vmin can be more surely detected as compared to the image pickup unit 1C.

Second Embodiment

Figure 17:
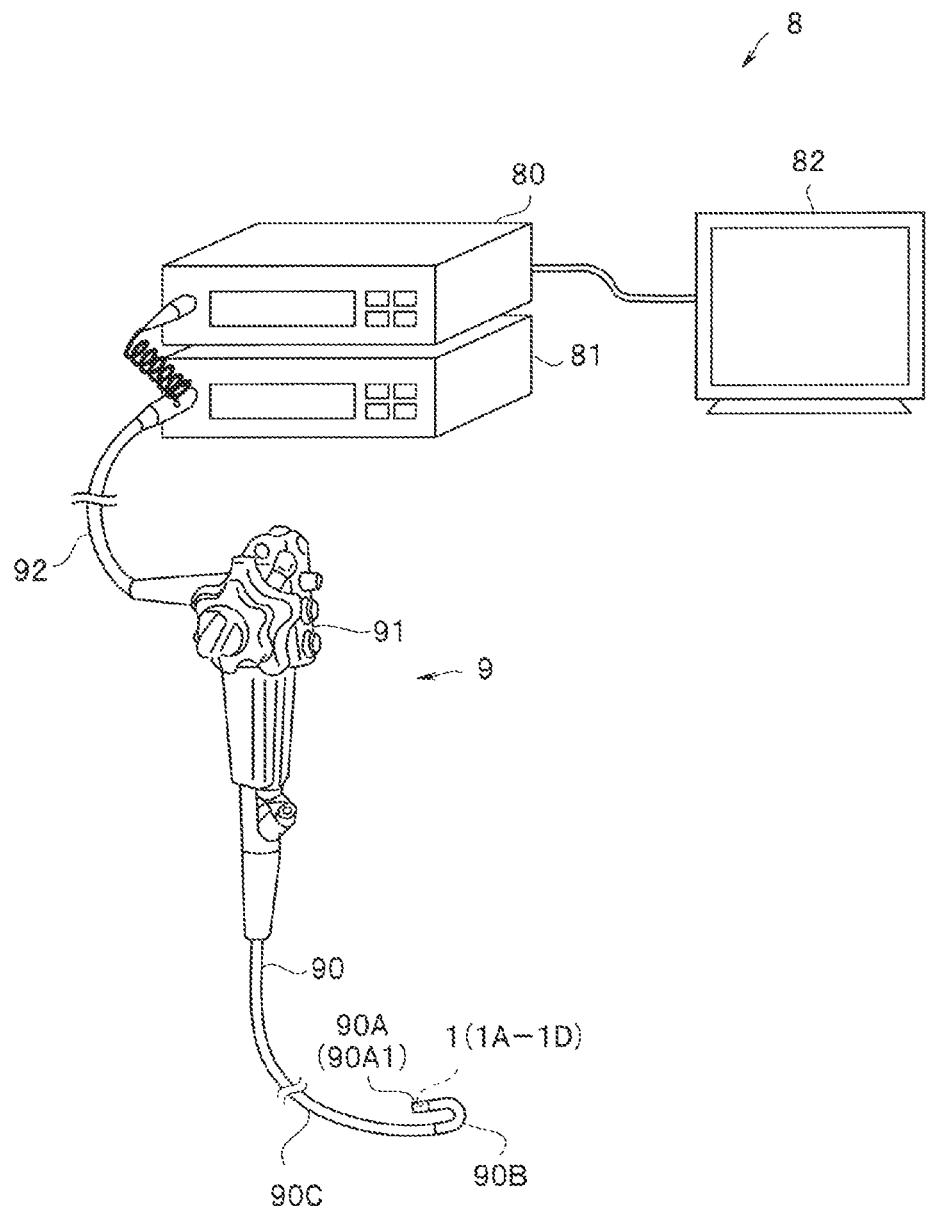
FIG. 17 is a perspective view of an endoscope of a second embodiment.

An endoscope 9 of the present embodiment shown in FIG. 17 includes an insertion portion 90, an operation portion 91, and a universal cord 92. The endoscope 9 constitutes an endoscope system 8 together with a processor 80, a light source device 81, and a monitor 82.

The insertion portion 90 in an elongated tubular shape is inserted into a body cavity of a living body. The insertion portion 90 is continuously provided with a distal end portion 90A, a bending portion 90B, and a flexible tube 90C from a distal end side in order and is generally flexible.

The bending portion 90B is bent in the up, down, left, and right directions in accordance with rotating operation of a bending knob of the operation portion 91 for performing bending operation.

The flexible tube 90C is a flexible tubular member that is passively flexible. A treatment instrument insertion channel, various electric signal lines, a light guide fiber bundle, and the like are inserted through the inside of the flexible tube 90C. The electric signal lines are extended from the image pickup unit that is built in the distal end portion 90A through the operation portion 91 to the universal cord 92. The light guide fiber bundle guides the light from the light source device 81 to a distal end surface of the distal end portion 90A.

The operation portion 91 is continuously provided in a proximal end portion of the insertion portion 90 and includes a plurality of operation members and the like. The universal cord 92 is a flexible tubular member extending from the operation portion 91.

The distal end portion 90A includes a cylindrical rigid member 90A1, inside of which the image pickup unit 1 (1A-1D) is disposed.

The endoscope 9 includes the image pickup unit 1, 1A to 1D disposed in the distal end portion 90A of the insertion portion 90. As already described, since the image pickup units 1, 1A to 1D are excellent in reliability and performance, the endoscope 9 is excellent in reliability and performance.

The endoscope may be a flexible endoscope with a flexible insertion portion or a rigid endoscope with a rigid insertion portion. The endoscope may be for medical use or industrial use.

Modification of Second Embodiment

Figure 18:
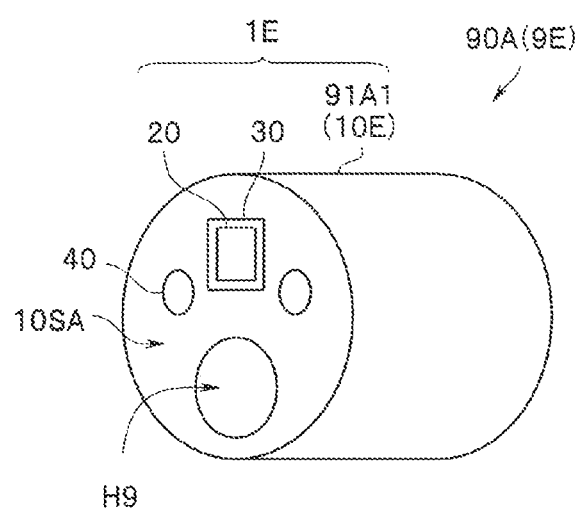
FIG. 18 is a perspective view of a distal end rigid portion of an endoscope of a modification of the second embodiment.

In an endoscope 9E of the present modification shown in FIG. 18, a three-dimensional wiring board 10E is a rigid member 91A1. In other words, in an image pickup unit 1E, the stacked device 20 and the resin 30 are disposed in a recess on a distal end surface (first principal surface 10SA) of the cylindrical three-dimensional wiring board 10E. The rigid member 91A1 includes a through hole H9 for a treatment instrument insertion channel. An illumination unit 40 that irradiates the illumination light guided by the light guide fiber bundle is disposed in the rigid member 91A1. Note that the illumination unit 40 may be a light emitting device, such as an LED, mounted on the distal end surface.

In the image pickup unit 1E, the stacked device 20 is disposed in a recess with the same configuration as the configuration of any one of the image pickup units 1, 1A-1D. Therefore, the image pickup unit 1E exhibits the same effects as the effects of any one of the mage pickup units 1, 1A-1D. In the endoscope 9E, since the three-dimensional wiring board 10E of the image pickup unit 1E is the rigid member 91A1, a distal end rigid portion 91A has a small-diameter and the manufacturing is easy.

The present invention is not limited to the aforementioned embodiments and the like, and various changes, combinations, and applications are available within the scope without departing from the gist of the invention.

What is claimed is:

1. An image pickup unit comprising:
    a three-dimensional wiring board including a recess having an opening on a first principal surface and having a bottom surface, wherein a wall surface of the recess has an inclination angle of an upper region adjacent to the opening that is smaller than an inclination angle of a lower region adjacent to the bottom surface, the three-dimensional wiring board including a bonding electrode on the bottom surface of the recess;
    a stacked device disposed in the recess, the stacked device including an optical system and an image pickup device, wherein the image pickup device of the stacked device includes a solder bump on an electrode on a back surface of the image pickup device, and the solder bump is bonded to the bonding electrode of the three-dimensional wiring board; and
    resin disposed in a gap between the recess and the stacked device.

2. The image pickup unit according to claim 1, wherein the upper region is a region where a depth from the first principal surface is 25% or less of a depth of the recess.

3. The image pickup unit according to claim 1, wherein the wall surface comprises, between the upper region and the lower region, at least one middle region parallel or substantially parallel to the bottom surface of the recess.

4. The image pickup unit according to claim 3, wherein the wall surface comprises a projection in a position surrounding the stacked device in the middle region.

5. The image pickup unit according to claim 3, wherein the wall surface comprises a notch in the middle region.

6. The image pickup unit according to claim 2, wherein the wall surface comprises, between the upper region and the lower region, a plurality of middle regions substantially parallel to the bottom surface of the recess.

7. An endoscope comprising:
    a three-dimensional wiring board including a recess having an opening on a first principal surface and having a bottom surface, wherein a wall surface of the recess has an inclination angle of an upper region adjacent to the opening that is smaller than an inclination angle of a lower region adjacent to the bottom surface, the three-dimensional wiring board including a bonding electrode on the bottom surface of the recess;
    a stacked device disposed in the recess, the stacked device including an optical system and an image pickup device, wherein the image pickup device of the stacked device includes a solder bump on an electrode on a back surface of the image pickup device, and the solder bump is bonded to the bonding electrode of the three-dimensional wiring board; and
    resin disposed in a gap between the recess and the stacked device.

8. The endoscope according to claim 7, wherein the three-dimensional wiring board is a cylindrical rigid member disposed in a distal end portion of an insertion portion.

9. The endoscope according to claim 7, wherein the upper region is a region where a depth from the first principal surface is 25% or less of a depth of the recess.

10. The endoscope according to claim 7, wherein the wall surface comprises, between the upper region and the lower region, at least one middle region parallel or substantially parallel to the bottom surface of the recess.

11. The endoscope according to claim 10, wherein the wall surface comprises a projection in a position surrounding the stacked device in the middle region.

12. The endoscope according to claim 10, wherein the wall surface comprises a notch in the middle region.

13. The endoscope according to claim 9, wherein the wall surface comprises, between the upper region and the lower region, a plurality of middle regions substantially parallel to the bottom surface of the recess.

* * * * *